Sept. 27, 1955  J. J. GRUBENMANN  2,719,045
SHAFT SEALS
Filed July 21, 1950
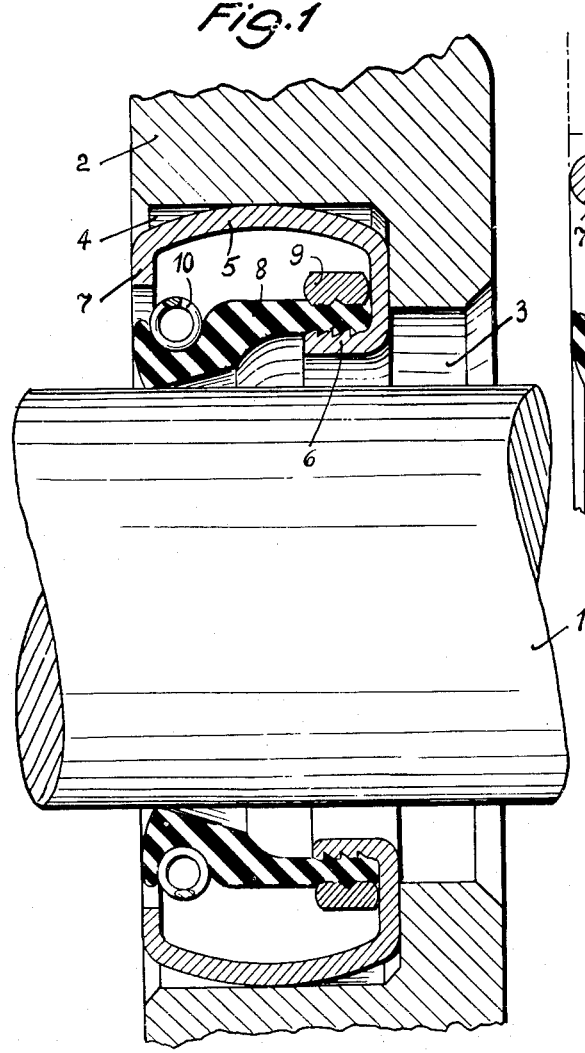
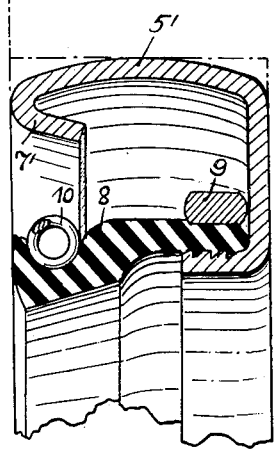
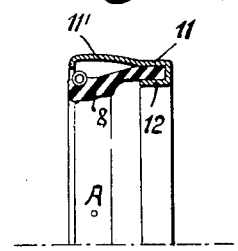
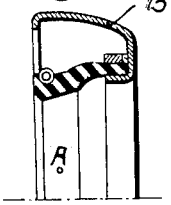
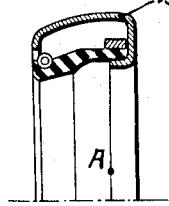
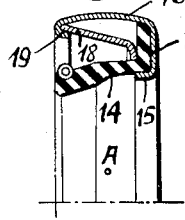
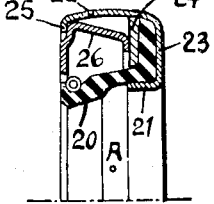
INVENTOR.
Johann Jakob Grubenmann
BY
Michael S. Striker

# United States Patent Office 2,719,045
Patented Sept. 27, 1955

2,719,045

SHAFT SEALS

Johann Jakob Grubenmann, Horgen, Switzerland

Application July 21, 1950, Serial No. 175,074

Claims priority, application Switzerland July 23, 1949

3 Claims. (Cl. 286—5)

The present invention relates to an improved shaft seal.

The known shaft seals that include an annular casing to be inserted into the bore of a machine unit, which bore is to be sealed and through which the shaft extends, and a rubber disc, inserted into this casing, have the drawback that they must be inserted very carefully and strictly co-axially into the bore of the machine unit to be sealed, as otherwise the casing, the bore or both will be subject to irreparable deformations that will jeopardize the tightness of the seal. Insertion of such a seal, especially at places difficult to get at, often is very difficult. Therefore, special devices are often made use of in inserting shaft seals of this kind. With such devices damages of the shaft seal casing or the bore, into which these seals are to be inserted, may be avoided but installing the shaft seal will still be inconvenient. In many cases the spatial conditions prevent the application of a special inserting device. By the present invention these drawbacks are overcome.

The object of the present invention is to provide a shaft seal with an annular casing to be inserted into the bore of a machine unit to be sealed and through which the shaft extends, with a ferrule-like rubber collar to be inserted into this casing, an end of which extends toward the open end of the casing and snugly fits the shaft, at least one portion of the external surface of the casing having the approximate shape of a portion of a sphere.

A further object of the present invention is to provide the casing of the shaft seal with a socket, which extends axially toward the open end of the casing, encompassing the shaft with ample clearance and serving as a support for the rubber collar.

In contrast to the known shaft seals of this kind, the casings of which have a cylindrical outer surface, with the seal according to the present invention it does not matter whether it be inserted exactly co-axially into the bore of the machine unit through which the shaft extends, since by giving the outer surface of this casing approximately the shape of a spherical zone, the inner surface of the bore always will keep in contact with a meridian of this spherical zone even if the casing of the shaft seal is not exactly co-axial with the bore. The socket on which the rubber collar is arranged allows for some inclination of the casing by encompassing the shaft with ample clearance. The shaft seal according to the invention offers, therefore, the advantages that sealing of the bore in the machine unit is maintained even if the seal is not quite co-axial with the bore and that placing of the seal into the bore is considerably facilitated since co-axiality is no longer essential.

The drawing shows, by way of example, an embodiment of the invention and furthermore six different embodiments of same.

In the drawing:

Fig. 1 is an axial section through a shaft seal and

Figs. 2 to 7 respectively show half of an axial section through six different embodiments of this shaft seal.

A shaft 1 extends through a member 2, such as a machine unit, having a boring 3 inside of which shaft 1 is to be sealed. The boring 3 is cylindrically countersunk at 4 so as to form a first portion, a second portion, and a shoulder connecting the cylindrical wall portions of the first and second portions. The shaft seal includes a hollow casing 5 of plate, plastic or the like, having a wall portion that bears on the shoulder that limits the countersunk bore 4 and is given the shape of a socket 6 that points axially in the direction of the open end of the casing and encompasses the shaft with ample clearance. The casing 5 is provided with a substantially spherical wall portion abutting against the cylindrical countersunk wall portion 4 with a press-fit tightness. The spherical wall portion forms a spherical zone having an intermediate plane between the limiting planes that includes a great circle. On the side of the casing which is open the rim 7 of this casing 5 is flanged radially inwardly. On the socket 6 a resilient sleeve, such as a rubber collar 8 is arranged and held in position by means of a clamping ring 9. In order to improve the hold of the rubber collar on the socket 6, the latter is corrugated on the outer surface. The rubber collar 8 extends inside the casing 5 right to the plane of the rim 7, so as to be flush with the same, and its free end bears on the shaft 1. Close to the free end that points toward the open end of the casing, a circumferential groove is provided in the outer surface of the rubber collar 8, in which a spring ring 10 is arranged in order to increase the pressure on the free end of the rubber collar 8 which bears on the shaft 1.

The embodiment of the shaft seal according to Fig. 2 differs from that described above in that the rim 7' of the casing 5' facing the space to be sealed not only is flanged radially inward but further extends into the casing 5'.

With the embodiment of the shaft seal according to Fig. 3 the casing is given a cylindrical shape at portion 11, which portion is coextensive with the socket 12 which is directed in an axial direction. The leather collar 8 in this case is jammed into the annular space between the socket 12 and the cylindrical portion 11 of the casing. The cylindrical portion 11 of the casing extends to the portion 11', the outer surface of which approximates a spherical zone. The outer surface of the portion 11' need not necessarily be a spherical zone with equal end faces, i. e. a symmetrical zone. The meridian in the plane that crosses the axis of the shaft at right angles, on the contrary, may just as well be offset from the middle of the casing and its position is marked by a point A with the embodiment according to Fig. 3.

The embodiments according to Figs. 4 and 5 respectively also include casings 13 and 13' respectively, the outer surfaces of which are given a non-symmetrical shape approximating a spherical zone, whereby with the embodiment according to Fig. 4 the end plane with the large diameter is at the open end of the casing, whereas with the embodiment according to Fig. 5 the end plane with the smaller diameter is at the open end of the casing. The position of the plane that crosses the axis of the shaft seal at right angles and in which the meridian of the spherical zone lies, is marked with a point A in both cases.

With the embodiment of the shaft seal according to Fig. 6 the rubber collar 14 bears not only on the axially flanged socket 15 of the casing 16, but, also on the radial flange 17 which connects the socket 15 to the outer portion of the casing 16. By means of an expanding ring 18 held in position by the flange 19 of the open end of the casing 16, the rubber collar 14 is pressed against the socket 15 as well as against the radial flange 17. Again the position of the plane that crosses the axis at right angles and in which the meridian of the outer surface of the casing 16, which is given the shape of a spherical zone, lies, is marked by a point A.

Also with the embodiment of the shaft seal according to Fig. 7 the rubber collar 20 bears on the radial flange 23 which connects the axially flanged socket 21, with the outer wall of the casing 22. Inside the casing 22 is arranged a ring 24 which is pressed against the flange of the rubber collar 20 that is urged against the radial flange 23 by the expanding ring 26, which in its turn bears on the flanged rim 25 of the casing 22.

I claim as my invention:

1. A shaft seal comprising in combination, a member formed with a boring with a cylindrical wall portion; a shaft extending through said boring of said member, said shaft having a diameter appreciably smaller than the diameter of said cylindrical wall portion so as to form an annular space therewith; a hollow casing arranged in said annular space so as to surround said shaft, said casing having an annular, convex outer side wall portion abutting against said cylindrical wall portion of said boring and forming part of a sphere whose diameter is substantially equal to that of said cylindrical wall portion of said boring; and a resilient sleeve having one end secured to said casing, the other end of said resilient sleeve being in sealing contact with said shaft, whereby said annular convex wall portion of said casing maintains a sealing contact with said cylindrical wall portion of said boring of said member in any position of said casing.

2. A shaft seal, comprising in combination, a member formed with a boring with a first portion, a second portion and a shoulder joining said portions, said portions having each a cylindrical wall portion, the cylindrical wall portion of said second portion having a smaller diameter than said cylindrical wall portion of said first portion; a shaft extending through said boring of said member, said shaft having a diameter appreciably smaller than the diameters of said cylindrical wall portions so as to form an annular space with said cylindrical wall portion of said first portion of said boring; a hollow casing arranged in said annular space so as to surround said shaft, said casing having an annular, convex outer side wall portion abutting against said cylindrical wall of the first portion of said boring, and a wall portion abutting against said shoulder of said boring, said annular convex wall portion of said casing forming part of a sphere whose diameter is substantially equal to that of said cylindrical wall of the first portion of said boring; and a resilient sleeve having one end secured to said wall portion abutting against said shoulder, the other end of said resilient sleeve being in sealing contact with said shaft, whereby said annular convex wall portion of said casing maintains a sealing contact with said cylindrical wall of the first portion of said boring of said member in any position of said casing.

3. A shaft seal, comprising in combination, a member formed with a boring with a first portion, a second portion and a shoulder joining said portions, said portions having each a cylindrical wall portion, the cylindrical wall portion of said second portion having a smaller diameter than said cylindrical wall portion of said first portion; a shaft extending through said boring of said member, said shaft having a diameter appreciably smaller than the diameters of said cylindrical wall portions so as to form an annular space with said cylindrical wall portion of said first portion of said boring; a hollow casing arranged in said annular space so as to surround said shaft, said casing having an annular, convex outer side wall portion abutting against said cylindrical wall of the first portion of said boring, and a wall portion abutting against said shoulder of said boring, said annular convex wall portion of said casing forming part of a sphere whose diameter is substantially equal to that of said cylindrical wall of the first portion of said boring; a resilient sleeve having one end secured to said wall portion abutting against said shoulder, the other end of said resilient sleeve being in sealing contact with said shaft; and an expanding ring arranged inside said casing and extending from a part of said casing distant from said shoulder to said one end of said resilient sleeve so as to hold said sleeve firmly in position, whereby said annular convex wall portion of said casing maintains a sealing contact with said cylindrical wall of the first portion of said boring of said member in any position of said casing.

References Cited in the file of this patent

UNITED STATES PATENTS

| 1,222,373 | Epstein | Apr. 10, 1917 |
| 1,571,605 | Salles | Feb. 2, 1926 |
| 1,740,929 | Loock | Dec. 24, 1929 |
| 2,055,918 | Victor et al. | Sept. 29, 1936 |
| 2,362,843 | Northrup | Nov. 14, 1944 |
| 2,447,411 | Hellfrecht | Aug. 17, 1948 |
| 2,622,943 | Wankat et al. | Dec. 23, 1952 |